(12) United States Patent
Roberson

(10) Patent No.: US 6,307,151 B1
(45) Date of Patent: Oct. 23, 2001

(54) TECHNIQUE FOR REDUCING LOW FREQUENCY INTERFERENCE NOISE

(75) Inventor: David L. Roberson, Forest, VA (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/324,111

(22) Filed: Jun. 2, 1999

(51) Int. Cl.⁷ ..................................................... H05K 9/00
(52) U.S. Cl. ........................................ 174/35 R; 455/298
(58) Field of Search ........................... 174/35 R, 35 GC; 361/816, 818, 799, 800; 455/298, 117

(56) References Cited

U.S. PATENT DOCUMENTS

| | | | |
|---|---|---|---|
| 5,218,284 | 6/1993 | Burns et al. | 320/14 |
| 5,525,895 | 6/1996 | Fishman | 323/268 |
| 5,597,979 | * 1/1997 | Courtney et al. | 174/35 R |
| 5,633,572 | 5/1997 | Steele et al. | 320/2 |
| 5,832,371 | * 11/1998 | Thornton | 455/90 |
| 5,999,365 | * 12/1999 | Hasegawa et al. | 360/97.02 |

* cited by examiner

Primary Examiner—Dean A. Reichard
Assistant Examiner—Hung V Ngo
(74) Attorney, Agent, or Firm—Jenkens & Gilchrist, P.C.

(57) ABSTRACT

A technique for reducing low frequency baseband interference noise is disclosed. The low frequency baseband interference noise typically takes the form of low frequency magnetic interference emanating from a power source providing low frequency switching currents. The power source typically has a supply current terminal and an oppositely disposed return current terminal. The technique is realized by enclosing the power source in an electrically conductive sheath, wherein the electrically conductive sheath has an input terminal disposed proximate the supply current terminal and an output terminal disposed proximate the return current terminal. The output terminal is electrically connected to the return current terminal. Also, the electrically conductive sheath has an opening proximate the supply current terminal for allowing access to the supply current terminal.

20 Claims, 3 Drawing Sheets

TECHNIQUE FOR REDUCING LOW FREQUENCY INTERFERENCE NOISE

FIELD OF THE INVENTION

The present invention relates generally to reducing interference noise in electronic circuitry and, more particularly, to a technique for reducing low frequency baseband interference noise in digital cellular telephones and the like.

BACKGROUND OF THE INVENTION

In recent years, the use of mobile telephones has increased dramatically due to the obvious convenience and benefits associated with such use, as well as the increased availability and affordability of mobile telephone service. This increased availability and affordability of mobile telephone service is due, at least in part, to the adoption of digital cellular standards and the use of low cost digital electronic components. However, some problems have arisen as a result of the adoption of these standards and the use of these components.

For example, people who wear hearing aids are finding that the T-coil mode of operation of a hearing aid is unacceptably noisy when operating a digital cellular telephone. This noise is a result of low frequency baseband interference from the digital cellular telephone coupling into the hearing aid, thereby masking the audio signals emanating from the audio signal generator in the earpiece of the digital cellular telephone. More particularly, this noise is a result of low frequency digital switching currents flowing within the battery of the digital cellular telephone. These low frequency digital switching currents generate corresponding low frequency magnetic fields which couple into the hearing aid and cause the masking of the audio signals emanating from the audio signal generator in the earpiece of the digital cellular telephone. These low frequency digital switching currents, and the corresponding generated low frequency magnetic fields, are particularly bothersome in areas surrounding the battery of the digital cellular telephone since this is where these currents and fields are at their greatest magnitude as all supply and return currents for the electronic circuitry of the digital cellular telephone originate from and return to the battery, respectively.

The above-described low frequency baseband interference is a relatively new problem which has come onto the scene as a result of the introduction of digital cellular telephones. Normal hearing persons have no perception of the low frequency magnetic fields propagating within and around a digital cellular telephone unit. However, hearing impaired persons are well aware of these low frequency magnetic fields as their hearing aids respond quite well to these rouge magnetic fields, making the digital cellular telephone unit essentially unusable when a hearing aid is operating in the T-coil mode of operation.

In order to allow universal use of digital cellular telephones and accommodate the needs of hearing impaired persons, both private digital cellular telephone manufacturers and government regulatory entities have been in search of a solution to the above-described interference noise problem. One proposed solution to this interference noise problem involves placing an electrically conductive shield around the entire digital cellular telephone unit so as to reduce any unwanted emissions. However, this solution can be costly and really only reduces high frequency emissions (e.g., due to skin effect), not the relatively low frequency emissions associated with digital switching currents. Thus, a need still remains for a technique for reducing low frequency baseband interference noise in digital cellular telephones and the like.

In view of the foregoing, it would be desirable to provide a technique for reducing low frequency baseband interference noise in digital cellular telephones which overcomes the inadequacies and shortcomings of the above described and other proposed solutions. More particularly, it would be desirable to provide a technique for reducing low frequency baseband interference noise in digital cellular telephones and the like in an efficient and cost effective manner.

OBJECTS OF THE INVENTION

The primary object of the present invention is to provide a technique for reducing low frequency baseband interference noise in digital cellular telephones and the like in an efficient and cost effective manner.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for reducing low frequency baseband interference noise in digital cellular telephones and the like in an efficient and cost effective manner is provided. The low frequency baseband interference noise typically takes the form of low frequency magnetic interference emanating from a power source providing low frequency switching currents. The power source, which is typically one or more batteries connected in series, has a supply current terminal and an oppositely disposed return current terminal. The technique is realized by enclosing the power source in an electrically conductive sheath, wherein the electrically conductive sheath has an input terminal disposed proximate the supply current terminal and an output terminal disposed proximate the return current terminal. The output terminal is electrically connected to the return current terminal. Also, the electrically conductive sheath has an opening proximate the supply current terminal for allowing access to the supply current terminal.

The electrically conductive sheath preferably fully encloses the power source except for the opening proximate the supply current terminal. However, the electrically conductive sheath may have a uniform pattern throughout. Alternatively, the electrically conductive sheath may have a uniform pattern portion just surrounding the output terminal. In any event, the electrically conductive sheath is preferably disposed substantially coaxial around and/or equidistant from the power source.

In accordance with other aspects of the present invention, the electrically conductive sheath may be rigid or flexible. Also, the output terminal may be abutted against or affixed to the return current terminal.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
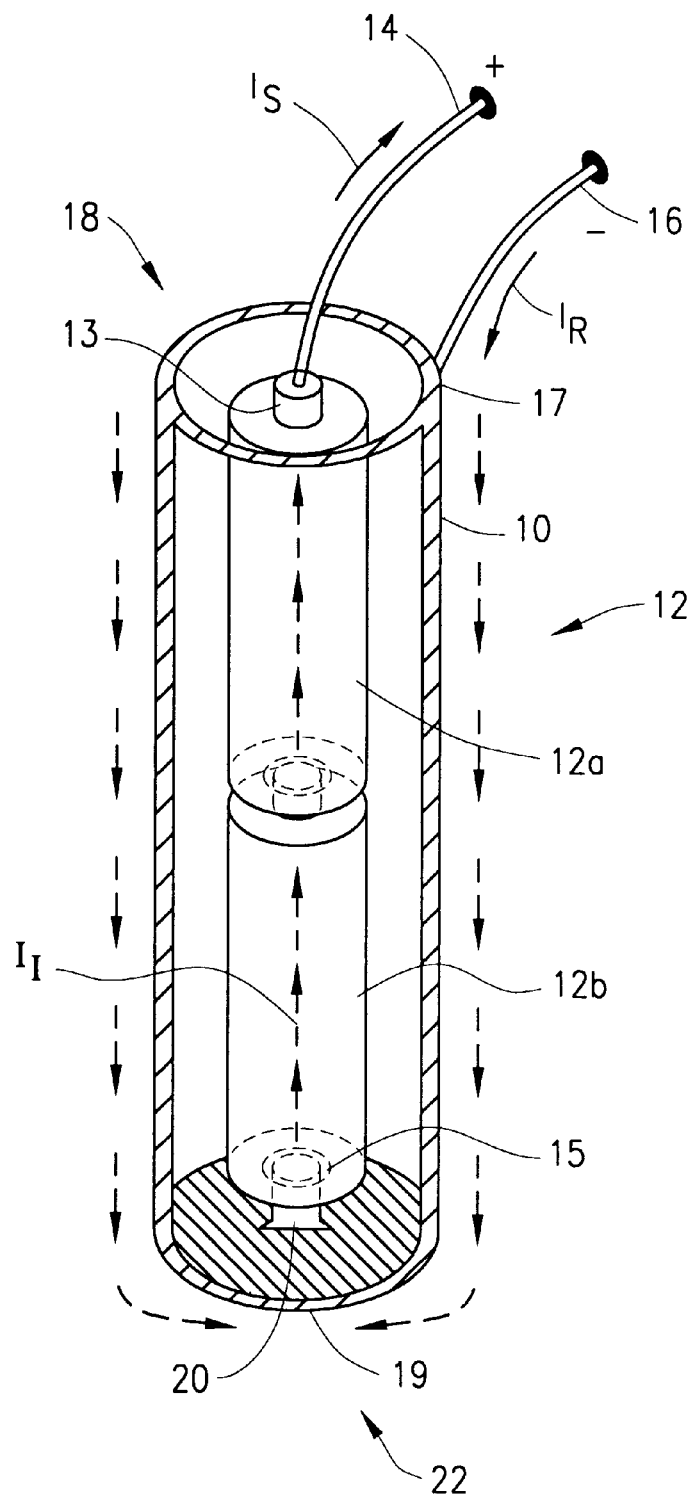
FIG. 1 is a side view of a first embodiment of an electrically conductive sheath having a cutaway portion to show batteries enclosed therein in accordance with the present invention.

Referring to FIG. 1, there is shown a side view of an electrically conductive sheath 10 for uniformly carrying a return current $I_R$ around an outer perimeter of a stack of series-connected batteries 12 so as to generate low frequency magnetic fields to counteract corresponding, but oppositely directed, low frequency magnetic fields generated by low frequency digital switching currents $I_I$ flowing within the batteries 12 in accordance with the present invention. This detailed description assumes that the batteries 12 (i.e, power source 12) provide a supply current $I_S$ to the electronic circuitry of a digital cellular telephone. However, the concept of the present invention can also be applied to other scenarios wherein the reduction of low frequency magnetic interference is desired.

The present invention noise reduction technique as realized in FIG. 1 is functional in that any low frequency digital switching currents $I_I$ that are flowing within the batteries 12 generate corresponding low frequency magnetic fields which are cancelled by corresponding, but oppositely directed, low frequency magnetic fields generated by low frequency digital switching return currents flowing through the electrically conductive sheath 10 surrounding the batteries 12. The batteries 12 are connected in series to provide a sufficient quantity of the supply current $I_S$ to the electronic circuitry of a digital cellular telephone. The batteries 12 may be affixed to each other or merely abutted against each other, but in either case the negative terminal of the first battery 12a is in electrical contact with the positive terminal of the second battery 12b. Further, it should be noted that although FIG. 1 shows a stack of series-connected batteries, the present invention noise reduction technique can also be utilized with only a single battery or other type of power source being used. The supply current $I_S$ is provided to the electronic circuitry of the digital cellular telephone via a first electrical conductor 14 that is electrically connected to the positive terminal of the first battery 12a which thus comprises the supply current terminal 13 of the power source 12.

The return current $I_R$ returns from the electronic circuitry of- the digital cellular telephone via a second electrical conductor 16 that is electrically connected to the electrically conductive sheath 10 at location 17 thereon which thus comprises the input terminal of the sheath. This second electrical conductor 16 should not be connected to any other grounds or neutrals. The electrically conductive sheath 10 is disposed completely around the batteries 12 from the top of the first battery 12a to the bottom of the second battery 12b, except for an opening 18 at the top of the first battery 12a for allowing the first electrical conductor 14 to pass therethrough. It is preferable that the second electrical conductor 16 be electrically connected to the electrically conductive sheath 10 proximate this opening 18, and that the first electrical conductor 14 be positioned proximate the second electrical conductor 16, since this allows low frequency magnetic fields generated by low frequency digital switching supply currents flowing through the first electrical conductor 14 to be cancelled by corresponding, but oppositely directed, low frequency magnetic fields generated by low frequency digital switching return currents flowing through the second electrical conductor 16. It is also preferable that the second electrical conductor 16 be electrically connected to the electrically conductive sheath 10 proximate this opening 18 since this allows low frequency digital switching return currents flowing through the second electrical conductor 16 to be uniformly distributed around the entire outer perimeter of the stack of series-connected batteries 12 from the top of the first battery 12a to the bottom of the second battery 12b as the low frequency digital switching return currents flow through the electrically conductive sheath 10 until the low frequency digital switching return currents are provided to the batteries 12 through a contact 20 that provides an electrical connection between the electrically conductive sheath 10 at location 19 thereon which thus comprises the output terminal of the sheath, and the negative terminal of the second battery 12b which thus comprises the return current terminal 15 of the power source 12. Of course, the electrically conductive sheath 10 could also be electrically connected directly to the negative terminal of the second battery 12b.

By allowing low frequency digital switching return currents that are flowing through the second electrical conductor 16 to be uniformly distributed around the entire outer perimeter of the stack of series-connected batteries 12 from the top of the first battery 12a to the bottom of the second battery 12b, the low frequency magnetic fields that are generated by these uniformly distributed low frequency digital switching return currents are allowed to counteract corresponding, but oppositely directed, low frequency magnetic fields that are generated by low frequency digital switching currents $I_I$ flowing within the batteries 12, thereby substantially eliminating any low frequency magnetic fields in the vicinity of the batteries 12 that are generated by low frequency digital switching currents $I_I$ flowing within the batteries 12.

As is typical with most all digital electronic circuitry, large supply current draws are often required from the power source that is providing the supply current to the digital electronic circuitry. These large supply current draws are generally a result of simultaneous transistor state switching within the digital electronic circuitry, but can also be a result of, for example, generating a radio frequency (RF) transmission pulse in a digital cellular telephone. In any event, these large supply current draws are the cause of the aforementioned low frequency digital switching currents $I_I$ flowing within the batteries 12, the low frequency digital switching supply currents flowing through the first electrical conductor 14, the low frequency digital switching return currents flowing through the second electrical conductor 16, and the uniformly distributed low frequency digital switching return currents flowing through the electrically conductive sheath 10.

At this point it should be noted that the present invention noise reduction technique is not limited to use with a substantially straight stack of series-connected batteries 12. For example, referring to FIG. 2, there is shown a side view of an electrically conductive sheath 30 that is disposed completely around a group of batteries 12, except, again, for an opening 18 at the top of the first battery 12a for allowing the first electrical conductor 14 to pass therethrough. The group of batteries 12 shown in FIG. 2 includes a first set of batteries 12a and 12b that are affixed or abutted against each other, and a second set of batteries 12c and 12d that are affixed or abutted against each other, with the negative terminal of the second battery 12b in the first set of batteries electrically connected to the positive terminal of the first battery 12c in the second set of batteries by a third electrical conductor 32. In this embodiment, the supply current terminal 13 of the power source 12 is the positive terminal of battery 12a, the input terminal 17 of the sheath is at the location at which second electrical conductor 16 is connected to the sheath, the return current terminal 15 of the power source is the negative terminal of battery 12d, and the output terminal 19 of the sheath is at the location where the sheath is electrically connected to the return current terminal. In this arrangement, the low frequency digital switching currents $I_f$ flowing within the first set of batteries is in a direction opposite to the low frequency digital switching currents $I_f$ flowing within the second set of batteries. Thus, the low frequency magnetic fields generated by the low frequency digital switching currents $I_f$ flowing within the first set of batteries are in a direction opposite to the low frequency magnetic fields generated by the low frequency digital switching currents $I_f$ flowing within the second set of batteries. However, these oppositely directed fields do not cancel each other out. Rather, residual low frequency magnetic fields would remain without the electrically conductive sheath 30. That is, the electrically conductive sheath 30 allows low frequency digital switching return currents that are flowing through the second electrical conductor 16 to be uniformly distributed around the entire outer perimeter of both sets of series-connected batteries 12 from the top of the first battery 12a in the first set of batteries to the bottom of the second battery 12d in the second set of batteries, thereby allowing the low frequency magnetic fields that are generated by these uniformly distributed low frequency digital switching return currents to counteract corresponding, but oppositely directed, low frequency magnetic fields that are generated by low frequency digital switching currents $I_f$ flowing within the batteries 12, thereby substantially eliminating any low frequency magnetic fields in the vicinity of the batteries 12 that are generated by low frequency digital switching currents $I_f$ flowing within the batteries 12.

Figure 2:
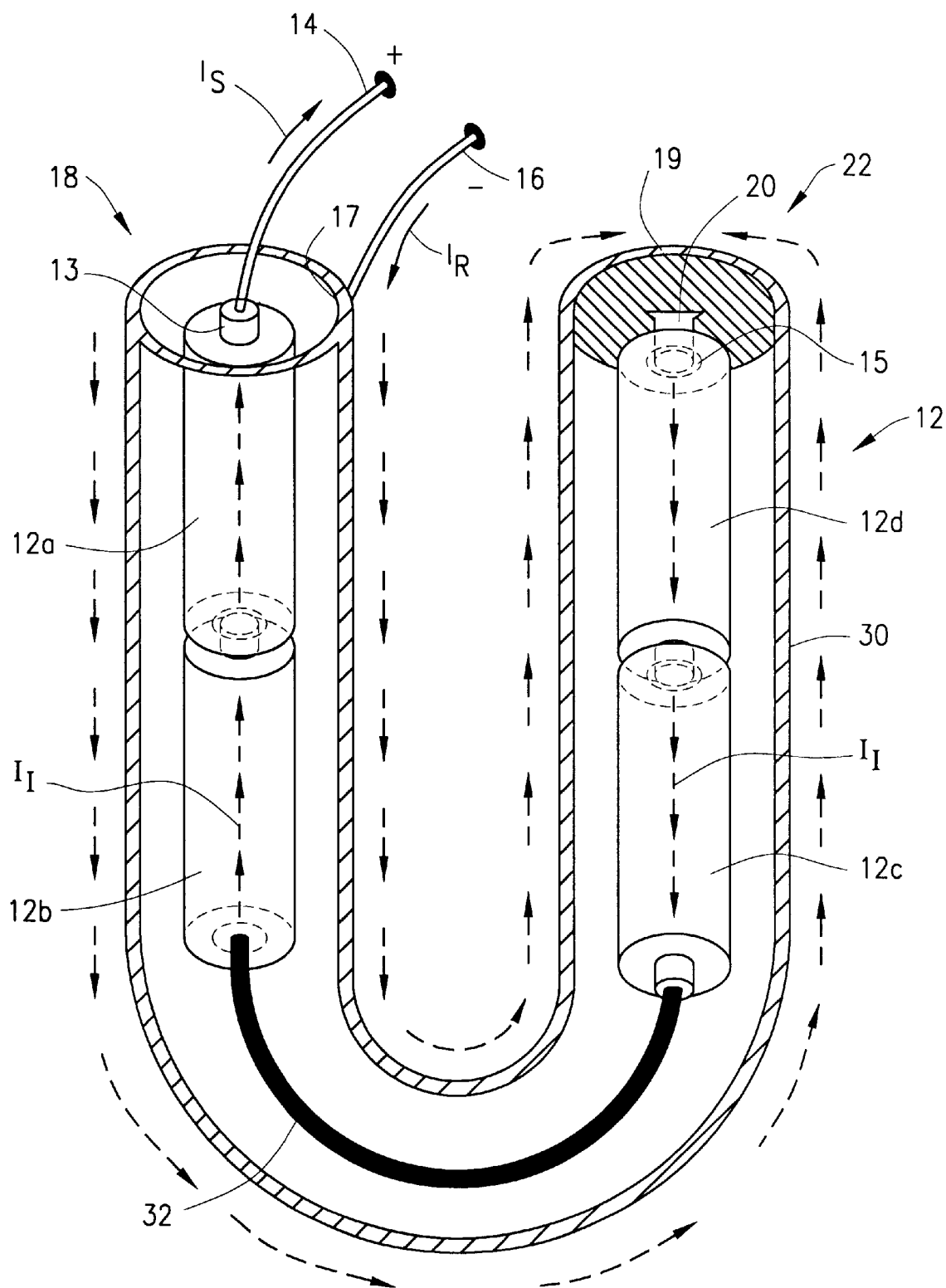
FIG. 2 is a side view of a second embodiment of an electrically conductive sheath having a cutaway portion to show batteries enclosed therein in accordance with the present invention.

In either of the embodiments of FIG. 1 or FIG. 2, or any other embodiment encompassing the scope of the present invention, it should be noted that it is preferable that the electrically conductive sheath 10, 30 is disposed substantially coaxial around and/or equidistant from the batteries 12 throughout so as to permit a uniform cancelling of the low frequency magnetic fields that are generated by low frequency digital switching currents $I_f$ flowing within the batteries 12 by the low frequency magnetic fields that are generated by uniformly distributed low frequency digital switching return currents flowing within the electrically conductive sheath 10, 30.

Figure 3:
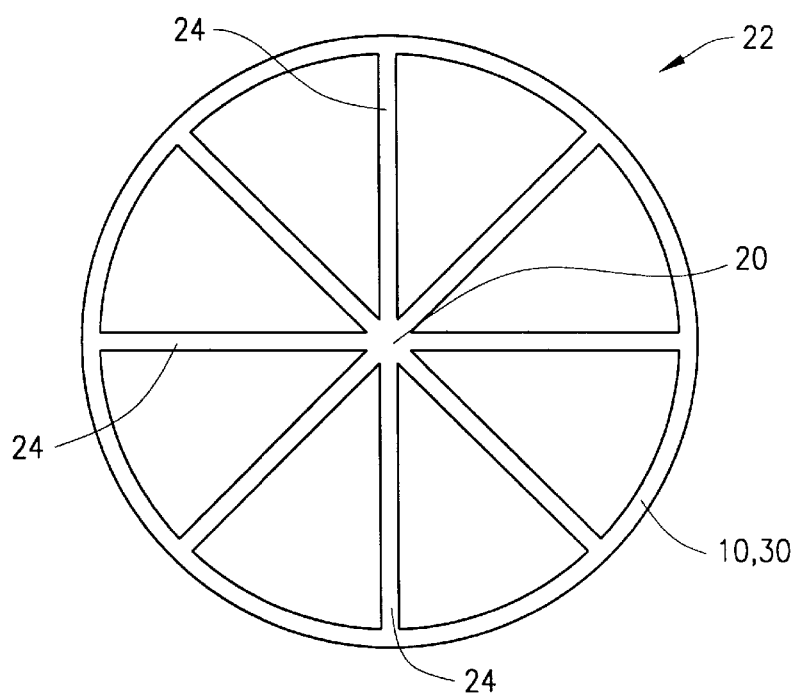
FIG. 3 is a embodiment of a spoked bottom portion of an electrically conductive sheath in accordance with the present invention.

It should be further noted that it is preferable that the bottom 22 of the electrically conductive sheath 10, 30 be fully enclosed for most effective operation and best results. However, the bottom 22 of the electrically conductive sheath 10, 30 could also assume a slightly different form while still achieving excellent results. For example, referring to FIG. 3, the bottom 22 of the electrically conductive sheath 10, 30 is shown having a plurality of spokes 24 electrically connecting the outer electrically conductive sheath 10, 30 to the contact 20. It should be noted, however, that the spokes 24 should be positioned symmetrical between the outer electrically conductive sheath 10, 30 and the contact 20 to insure uniform current flow.

Figure 4:
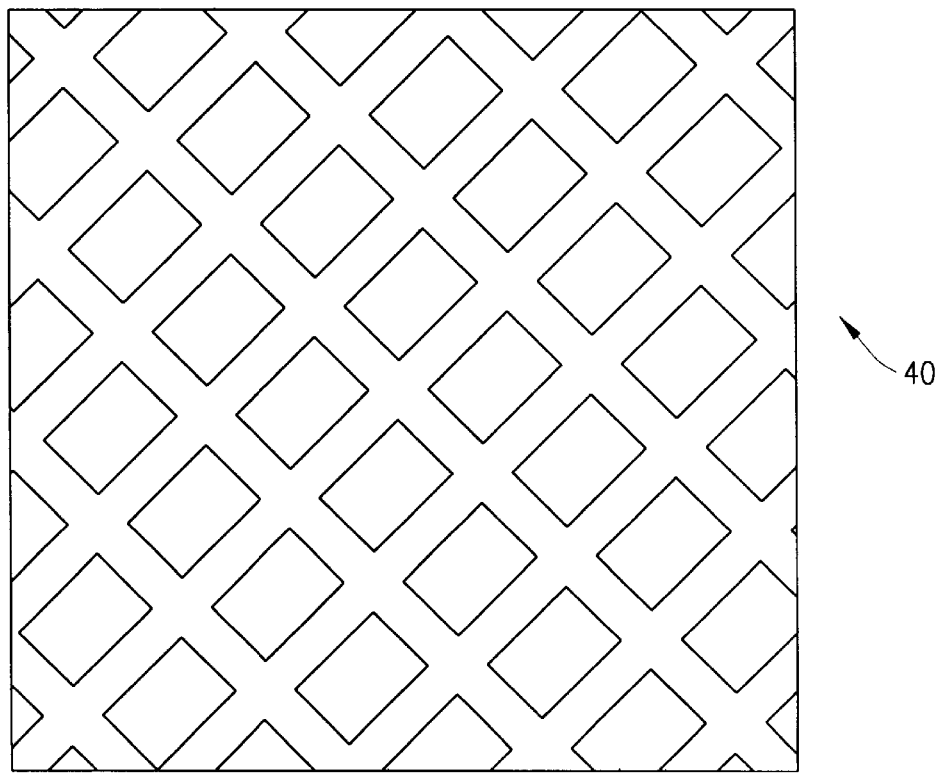
FIG. 4 is a mesh pattern for an electrically conductive sheath in accordance with the present invention.

Along those same lines, it is also preferable that the entire electrically conductive sheath 10, 30 fully enclose the batteries, except of course at the opening 18. However, good results may still be achieved if the electrically conductive sheath 10, 30 takes the form of a mesh or skeleton structure. For example, referring to FIG. 4, there is shown a mesh pattern 40 for the electrically conductive sheath 10, 30. Again, however, it should be noted that the mesh pattern 40, or any other pattern, should be uniform throughout to insure uniform current flow.

At this point it should be noted that the electrically conductive sheath 10, 30 may be fabricated of a variety of different electrically conductive materials. For example, tin-plated steel, brass, or copper could all be used. Also, the rigidity of the material may vary. That is, the electrically conductive sheath 10, 30 may be fabricated of an electrically conductive rigid material for supporting the batteries 12 therein, or an electrically conductive flexible material that can be formed to fit within certain cavities.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What claimed is:

1. In combination, a power source providing low frequency switching currents and an apparatus for reducing low frequency magnetic interference emanating from the power source, the power source comprising a supply current terminal and an oppositely disposed return current terminal, and the apparatus comprising an electrically conductive sheath enclosing the power source, the electrically conductive sheath having an input terminal disposed proximate the supply current terminal of said power source and an output terminal disposed proximate and electrically connected to the return current terminal of said power source.

2. The combination as defined in claim 1, wherein the electrically conductive sheath is disposed substantially coaxial around the power source.

3. The combination as defined in claim 1, wherein the electrically conductive sheath has an opening proximate the supply current terminal for allowing access to the supply current terminal.

4. The combination as defined in claim 1, wherein the electrically conductive sheath has a uniform pattern throughout.

5. The combination as defined in claim 1, wherein the electrically conductive sheath fully encloses the power source except for an opening proximate the supply current terminal for allowing access to the supply current terminal.

6. The combination as defined in claim 5, wherein the electrically conductive sheath has a uniform pattern portion surrounding the output terminal.

7. The combination as defined in claim 1, wherein the output terminal is electrically connected to the return current terminal through a contact.

8. The combination as defined in claim 1, wherein the electrically conductive sheath is disposed substantially equidistant from the power source substantially throughout.

9. The combination as defined in claim 1, wherein the electrically conductive sheath is rigid.

10. The combination as defined in claim 1, wherein the electrically conductive sheath is flexible.

11. A method for reducing low frequency magnetic interference emanating from a power source providing low frequency switching currents, the power source having a supply current terminal and an oppositely disposed return current terminal, the method comprising the steps of:

enclosing the power source in an electrically conductive sheath having an input terminal disposed proximate the supply current terminal of the power source and an output terminal disposed proximate the return current terminal of the power source, and electrically connecting the output terminal of the sheath to the return current terminal of the power source.

12. The method as defined in claim 11, wherein the electrically conductive sheath is flexible.

13. The method as defined in claim 11, wherein the electrically conductive sheath is disposed substantially coaxial around the power source.

14. The method as defined in claim 11, wherein the electrically conductive sheath has an opening proximate the supply current terminal for allowing access to the supply current terminal.

15. The method as defined in claim 11, wherein the electrically conductive sheath has a uniform pattern throughout.

16. The method as defined in claim 11, wherein the electrically conductive sheath fully encloses the power source except for an opening proximate the supply current terminal for allowing access to the supply current terminal.

17. The method as defined in claim 16, wherein the electrically conductive sheath has a uniform pattern portion surrounding the output terminal.

18. The method as defined in claim 11, wherein the electrically connecting step comprises electrically connecting the output terminal to the return current terminal through a contact.

19. The method as defined in claim 11, wherein the enclosing step comprises disposing the electrically conductive sheath substantially equidistant from the power source substantially throughout.

20. The method as defined in claim 11, wherein the electrically conductive sheath is rigid.

* * * * *